Jan. 30, 1962     L. F. BIRITZ     3,018,611
TIMER DEVICE AND METHOD FOR DETERMINATION
Filed Aug. 31, 1959
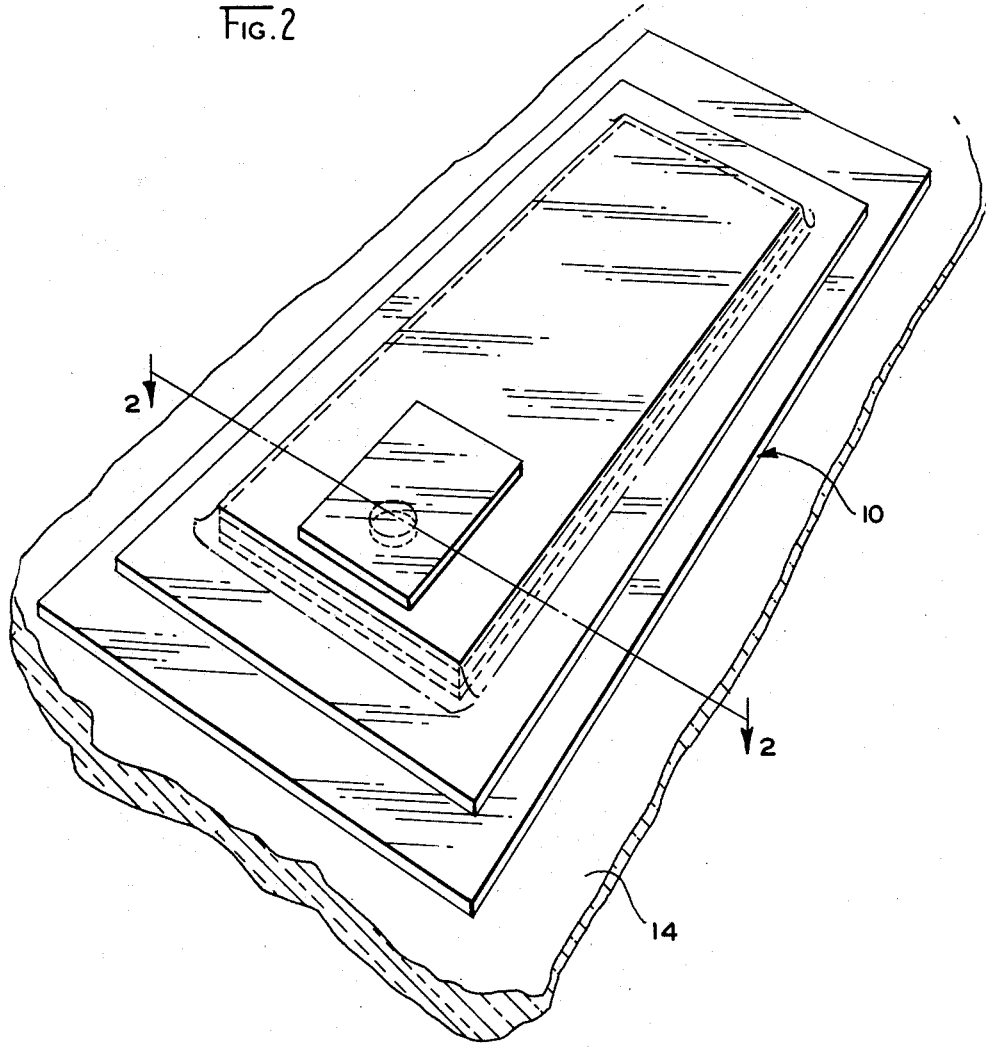
INVENTOR.
BY LASZLO F. BIRITZ
ATTORNEY

United States Patent Office

3,018,611
Patented Jan. 30, 1962

3,018,611
TIMER DEVICE AND METHOD FOR DETERMINATION
Laszlo F. Biritz, Chicago, Ill., assignor, by mesne assignments, to Felix D. Kolben
Filed Aug. 31, 1959, Ser. No. 837,001
13 Claims. (Cl. 58—1)

This invention relates to a timer device and a method for determining time intervals.

There is presently a need for an economical device, which can measure preselected time durations by means of a simple indicator which is insensitive to its ambient temperature.

It is one of the objects of the present invention to provide an indicator device using a chemical agent which will respond to atmosphere by a change in color or provide other visual indication of lapse of a predetermined time period.

It is another object of the invention to provide a time interval indicator device which can be readily calibrated to indicate a wide range of time durations, and is manufacturable with manufacturers' tolerances having relatively slight effect on the calibrated time period.

Another object of the invention is to provide a readily apparent visual criteria by which the observer can accurately determine the course of a predetermined time period and with an accuracy reproducible within one minute, this being accomplished by a chemical change phenomenon.

It is an important feature of the present invention that the time indicator device is relatively unaffected by storage and can be effectively preserved pending operation and without apparent adverse effect on the accuracy of the indicator.

Another important feature of the invention is the adaptability of the indicator to measure a wide range of time periods by merely varying the physical dimensions of the device or applying a greater or less number of openings by which the chemical agent is exposed to air. Once the calibration is made, however, the time period is only slightly affected by normal manufacturing tolerances so that accuracy of time determination is yet maintained.

A principal object of the present invention is to utilize a chemical transformation phenomenon as the visual indicating means with a time delay for total occurrence of the transformation which will correspond to the predetermined time period, such time delay being a physical phenomenon.

It is also important to the invention that the time indicator device is operated by simply unsealing passage means providing ingress of air to within said indicator device.

Other objects and features of the invention will become apparent from a consideration of the following description which proceeds with reference to the accompanying drawings wherein:

FIGURE 1 is an isometric view of the indicator device, shown before it is put into operation; and, FIGURE 2 is a section view taken on line 2—2 of FIGURE 1.

Although the actual shape of construction of the timer device may take numerous forms, the invention will be described in detail as a rectangular one and with reference to its usage in combination with packages of frozen food where it is important to provide an indication of the cooking time of the food. This is only one, however, of the many applications of the invention, such other usages being, for example, parking time, construction periods, etc. Many additional applications of the present invention are envisaged wherever it is desired to determine a set period of time in a convenient economical manner. It is intended that these numerous applications of the invention be included within the scope of the invention although not specifically enumerated since these additional applications are too varied and numerous to mention.

In the selected embodiment shown in FIGURES 1 and 2, a backing 10 of suitable pressure sensitive adhesive is readily attachable to the outer surface 14 of a package as, for example, frozen food. Superimposed on backing 10 is a strip of paper 16. The paper is a filter paper which is relatively soft and is identified by source No. 604, Schleicher & Schuell, manufacturers. This particular paper is soft and loose and the chemical reagent is quite easy to apply as a lamination over the surface of the paper.

A layer of unreacted oxygen-reactive material 18 is formed as a lamination over the upper surface of paper 16 and the layer 18 is hermetically sealed by a covering 20 of impervious pressure sensitive cellophane as, for example, "Scotch tape," the "Scotch tape" being transparent to allow visual inspection of the layer 18 which is covered and thereby sealed by covering 20. The backing 10 and covering 20 form, in effect, a container 22 for the material 18 effectively sealing the interior from air (oxygen being the particular gas to be excluded).

A small opening 23 of about pin hole size is formed in the covering 20 to allow for ingress of air within the interior of the container 22. In order to effectively seal the interior of the container, the outer edges 24 are turned outwardly and are in direct air-tight sealing contact with the backing 10. The opening 23 is located at one end of the device closely adjacent the edge and is sealed, pending usage by a removable tape 26 which is stripped off to uncover opening 23 to initiate the timing cycle.

The material 18 is reactive with oxygen and provides a color change when combined with oxygen so that it is readily contrastable with unreacted portions of the material. To start the decolorization the tape 26 is removed to expose the opening 23 to the atmosphere to permit air to enter and diffuse to make contact with the radical. Beginning at the end with the opening 23 the decolorization (for example green to white) proceeds toward the other unexposed end. The endpoint is reached when no color difference between the two ends can be observed. It is important to the invention that the material used reacts substantially instantaneously with oxygen in the temperature ranges in which the device is intended to be used, and as previously stated, the present device has as one of its features, the indication of time periods without being affected by ambient temperature.

Suitable chemical reactants which have been found to possess the necessary reaction characteristics, including combination at low activation energy, are the free radical materials tri-p-nitrophenylmethyl, tri-p-nitrophenylylmethyl and tri-O-anisylmethyl. Using the free radical tri-p-biphenylylmethyl as an example material, this reaction may be represented chemically by the following equation:

(1)

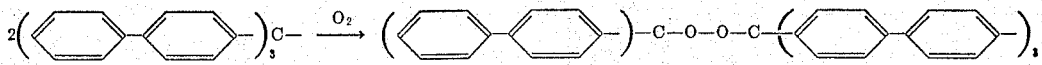

The tri-p-biphenylylmethyl is a solid radical having a characteristic dark green color; it is the completely dissociated form of p-hexabiphenylylethane. It reacts instantaneously with oxygen to form the colorless peroxide. Details of the reaction may be obtained from H. Gilman, "Organic Chemistry," John Wiley & Sons, 1944, pages 590 and 598. The reaction, as set forth in Equation 1 involves a readily detectable color transformation by which the dark green radical undergoes a bleaching to a substantially white or very light green shade. By contrasting the two colors, it is quite apparent when the material is entirely reacted and this signals the end of the time duration. This bleaching will take place as soon as outside air, regardless of temperature, can reach the material since the reaction proceeds instantaneously.

The p-tribiphenylylmethyl radical is prepared in three stages. The first stage is reacting p-chlorobiphenyl with diethyl carbonate and sodium to form p-tribiphenylylmethyl carbinol. The reaction was carried out exactly the same way as described in Organic Synthesis, coll. vol. 3, 831 (1955). The second stage is wherein p-tribiphenylylmethyl carbinol was converted into p-tribiphenylyl chloride with acetyl chloride, based on the method for preparing triphenylmethyl chloride and the method by Schlenk. Organic Synthesis, vol. 3, 841 (1955), Schlenk, W., Ann. 368, 303 (1909). And at the third stage, the radical, p-tribiphenyl chloride is reacted with copper powder substantially as described by Schlenk, W., Ann. 372, 1 (1910). In this last step, it is of utmost importance to achieve complete conversion of the p-tribiphenylylmethylchloride to the radical. With unreacted chloride present, the accurate observation of the end point of the decolorization reaction is nearly impossible.

The time control is effected by proper selection of the size of the opening 23 which admits air at a rate inversely proportional to temperature. Note R. D. Present, "Kinetic Theory of Gases," McGraw-Hill, 1958, page 22.

Once air enters the container 22, the oxygen fraction of the air will react with the free radical upon diffusion of the air through the container, the diffusion rate being proportional to temperature. It can therefore be seen that the rate of conversion of the dark green free radical to its bleached peroxide form is dependent upon passage of air through the opening (an inverse function of temperature) and diffusion (favorably affected by increase of temperature), these two factors being oppositely affected by temperature and therefore counterbalancing each other. The result is that rate of conversion of the free radical to its peroxide form progresses substantially unaffected by ambient temperature.

It should be further noted that both of the foregoing effects, i.e., movement of air through the opening 23 and diffusion through the container 22 are governed by absolute temperature; and, therefore, at moderate temperatures (minus 20 F. to plug 120 F.), the rate of change in flow and diffusion are not substantially affected percentagewise. As a result, the rate of conversion of free radical to peroxide will proceed as a function of time independently of temperature and the total time period does not necessitate precise control of these two factors of "effusion" and "diffusion."

The time period is affected, however, by the amount of chemical material 18, i.e., the thickness of the layer 18, its width and length and also the number of openings 23. It is relatively easy, however, to calibrate these parameters to obtain a precise measure of time period. For example, a device having a 10 mm. wide layer 18 which is 55 mm. long and has a pin hole opening 23 of 0.1–0.08 mm. will bleach entirely in about twenty-nine minutes.

This time period is relatively unaffected by both temperature and manufacturing tolerances as can be seen from the following chart:

| Temperature, ° C. | Decolorization Time, Minutes | Percent Deviation from 30° Value |
|---|---|---|
| 5 | 31 | +7 |
| 30 | 29 | 0 |
| 70 | 27 | −7 |

The above results were obtained using different specimens and different observers from which it can be concluded that objective observation is not critical and can be easily duplicated from one specimen to the next.

The amount of radical material in layer 18 is obtained most conveniently by settling firstly upon the desired thickness of coating and thereafter calibrating to provide the desired time duration by varying the width or length of the layer 18. For example, the width and/or length is simply increased to provide a proportionately greater time period or reduced to diminish the required time period. Another way of controlling the time period is to increase the number of openings. For example, by increasing the number of openings from one to two in the specimen of chart 1, the decolorization time is proportionately changed, i.e., two openings will decrease by 41% the twenty-nine minute period at 30° C. so that the time period is seventeen minutes.

In the examples cited in Equation 1, the visual change is from the dark green unreacted radical to the colorless peroxide. At lower temperature, the contrast of color becomes less apparent. It may be desirable to provide more apparent color contrasts by using different oxygen-reactive agents.

The invention may also take other construction forms of container in which letters are made visible within the container as the bleaching progresses. Such an arrangement would, of course, take advantage of the background color of the layer 18 and how it contrasts with the indicator letters which are made visible as the bleaching progresses.

The shape of the container is not critical. The container, in some applications, may consist of a tube spiral or ring in which the end portion of material is brought in close proximity with previously reacted portions so that the terminal material can be readily compared to sharpen the end point.

If desired, a mixture of two oxygen-reactive components may be used with satisfactory results. Since it is a color contrast rather than color itself, these proposed variations are all made with the view in mind of sharpening the end point.

As these shapes differ, and as the dimensions are varied, it is a matter of calibration skill to establish a definite hole size and area for a given time period.

The present invention can be constructed and operated successfully by following the foregoing construction and compositional teachings; but, the underlying scientific principles are also included for an even fuller understanding of the scope of the invention.

While the present invention has been explained in connection with selected embodiments of the invention, it will be understood that these are only illustrative of the invention and are not in any way restrictive thereof. It is intended, therefore, that such variations and revisions of the invention as are reasonably to be expected on the part of those skilled in the art, will be included within the scope of the following claims as equivalents of the invention.

I claim:

1. A temperature insensitive device for measuring time intervals comprising an oxygen-reactive material having a substantially insignificant activation energy for combination with oxygen to produce a reaction product visually contrastable with unreacted material, a transparent hermetically sealed container for said oxygen-reactive material, means forming a part of said container and defining an air inlet for said container and proportioned of a size providing inflow of air at a rate inversely to temperature, said oxygen-reactive material being combinable with inflowing air which is diffused within said container at a rate proportional to temperature and substantially counterbalancing the temperature induced variation of air inflow through said inlet, said oxygen-reactive material being thereby visually converted as a function of time and insensitively to temperature, and means for removably sealing said air inlet prior to usage of said device.

2. A temperature insensitive device for measuring time intervals comprising a hermetically sealed container having a transparent portion, an oxygen-reactive material characterized by substantially instantaneous reaction with oxygen to produce a color transformation reaction product contrastable with unreacted material and selected from the group consisting of free radicals of tri-p-biphenylylmethyl, tri-p-nitrophenylmethyl and tri-O-anisylmethyl, means forming a part of said container and defining a restricted air inlet for said container and proportioned of a size providing inflow of air at a rate inversely proportional to temperature, said oxygen-reactive material being combinable with inflowing air which is diffused within said container at a rate proportional to temperature and substantially counterbalancing the temperature induced variation of air inflow through said inlet, said oxygen-reactive material being thereby visually converted as a function of time and insensitivity to temperature, and means for removably sealing said air inlet prior to usage of said device.

3. A temperature insensitive device for measuring time intervals comprising a hermetically sealed container having a transparent portion for viewing the interior of said container, a substantially uniformly distributed quantity of oxygen-reactive material within said container to produce a reaction product visually contrastable with unreacted portions of said material, and means forming a restricted inlet for air to pass within the interior of said container and calibrated relatively to the amount of said reaction material to provide a measure of time according to the duration for total reaction of said oxygen-reactive material which becomes permeated by said air.

4. A temperature insensitive device for measuring time intervals comprising a hermetically sealed container having a transparent portion adapted for viewing the interior of said container, a quantity of substantially uniformly distributed oxygen-reactive material within said container and provided in an amount calibrated to convert to a contrastable reaction product of oxygen as a function of time, and means forming at least one restricted inlet which admits air and counterbalancing the rate of diffusion of air within said container whereby rate of distribution of air through said container is substantially independent of temperature, and rate of conversion of said oxygen-reactive material proceeds thereby as a function of time.

5. A temperature-insensitive device for measuring time, comprising a hermetically sealed container, a strip of filter paper within said container having a substantially uniform layer of oxygen-reactive material on at least one side thereof, means forming a transparent cover on said container for observing said oxygen-reactive material and noting the visually contrastable reaction product on comparison with unreacted oxygen-reactive material, and a plurality of restricted openings in said container for admitting air at a rate inversely proportional to temperature and balanced against the rate of diffusion of air within said container proceeding at a rate proportional to temperature whereby distribution of air through said container progresses substantially independently of temperature, said oxygen-reactive material being thereby converted to a contrastable oxygen-addition product at a rate which is a function of time, and means for removably covering said restricted openings for excluding air until initiation of reaction which is completed when said oxygen-reactive material is completely converted to signal the terminus of said period.

6. A temperature insensitive device for measuring time intervals comprising an oxygen-reactive material having a substantially insignificant activation energy for combination with oxygen to produce a reaction product visually contrastable with unreacted material, a transparent hermetically sealed container for said oxygen-reactive material, and means forming a part of said container and defining an air inlet for said container and proportioned of a size providing inflow of air at a rate inversely to temperature, said oxygen-reactive material being combinable with inflowing air which is diffused within said container at a rate proportional to temperature and substantially counterbalancing the temperature induced variation of air inflow through said inlet, said oxygen-reactive material being thereby visually converted as a function of time and insensitively to temperature.

7. A temperature insensitive device for measuring time intervals comprising a hermetically sealed container having a transparent portion, an oxygen-reactive material characterized by a substantially insignificant activation energy for combination with oxygen to produce a color transformation reaction product contrastable with unreacted material and selected from the group consisting of free radicals of tri-p-biphenylylmethyl, tri-p-nitrophenylmethyl and tri-O-anisylmethyl, and means forming a part of said container and defining a restricted air inlet for said container and proportioned of a size providing inflow of air at a rate inversely proportional to temperature, said oxygen-reactive material being combinable with inflowing air which is diffused within said container at a rate proportional to temperature and substantially counterbalancing the temperature induced variation of air inflow through said inlet, said oxygen-reactive material being thereby visually converted as a function of time and insensitively to temperature.

8. A temperature insensitive device for measuring time intervals comprising a hermetically sealed rectangular container having a transparent portion adapted for viewing the interior of said container, a quantity of substantially uniformly distributed oxygen-reactive material within said container and provided in an amount calibrated to convert to a contrastable reaction product of oxygen as a function of time, and means at one remote end of said container forming at least one restricted inlet which admits air at a rate inversely proportional to temperature conditions and counterbalancing the rate of diffusion of air within said container which proceeds at a rate directly proportional to temperature whereby rate of distribution of air through said container is substantially independent of temperature, and rate of conversion of said oxygen-reactive material proceeds from one remote end of the container and reaching the other remote end as a function of time.

9. A temperature-insensitive device for measuring time, comprising a hermetically sealed container, a strip of filter paper within said container having a substantially uniform layer of oxygen-reactive material on at least one side thereof, means forming a cover on said container and having a transparent portion for observing said oxygen-reactive material and noting the visually contrastable reaction product on comparison with unreacted oxygen-reactive material, and a plurality of restricted openings in said container for admitting air at a rate inversely proportional to temperature and balanced against the rate of diffusion of air within said container proceeding at a rate proportional to temperature whereby air is distributed through said container substantially independently of temperature, said oxygen-reactive material being thereby converted to a contrastable oxygen-addition product at a rate which is a function of time, and means for removably covering said restricted openings for excluding air until initiation of reaction which is completed when said oxygen-reactive material is completely converted to signal the terminus of said period.

10. A time indicator device adapted to provide preselected specific time periods in a manner insensitively to temperature changes and comprising a substantially uniform layer of oxygen-sensitive material, two layers of transparent material sealed at the outer edges to provide an air permeable container surrounding said oxygen-sensitive material, means forming a calibrated inlet for air which is proportioned to admit air to within said container at a rate inversely proportional to temperature, said air being diffused across the enclosed area to effect a bleaching of the oxygen-sensitive material and permeating the entire container to produce a visual color change of said material within said preselected time period.

11. The time indicator structure in accordance with claim 10 wherein said oxygen-sensitive material is characterized by reaction with oxygen at a substantially insignificant activation energy.

12. The time indicator structure in accordance with claim 11 wherein said oxygen-sensitive material is selected from the group consisting of free radicals of tri-p-biphenylylmethyl, tri-p-nitrophenylmethyl and tri-O-anisylmethyl.

13. A process for determining preselected time periods comprising the steps of confining an oxygen-sensitive material having substantially insignificant activation energy within an impervious container, balancing effusion of air through a restricted inlet in said container against rate of change of diffusion of said air through said container to provide permeation of said material by air as a function of time and insensitively to temperature, and thereby reacting said oxygen-sensitive material to effect transformation thereof to a visually contrastable reaction product, the entirety of said oxygen sensitive material being thereby reacted ratably as a function of time and completely transformed at the terminus of said predetermined time period.

References Cited in the file of this patent
UNITED STATES PATENTS

| | | |
|---|---|---|
| 2,337,534 | Barber | Dec. 28, 1943 |
| 2,785,057 | Schwab et al. | Mar. 12, 1957 |